United States Patent
Jha et al.

(10) Patent No.: US 10,736,021 B2
(45) Date of Patent: *Aug. 4, 2020

(54) COMMUNICATIONS SYSTEM

(71) Applicant: NEC CORPORATION, Tokyo (JP)

(72) Inventors: Vivek Jha, Bangalore (IN); Robert Arnott, London (GB); Suresh Ganapathy, London (GB)

(73) Assignee: NEC CORPORATION, Mintao-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,536

(22) Filed: Feb. 22, 2019

(65) Prior Publication Data
US 2019/0191362 A1 Jun. 20, 2019

Related U.S. Application Data

(60) Continuation of application No. 15/699,864, filed on Sep. 8, 2017, now Pat. No. 10,257,774, which is a (Continued)

(30) Foreign Application Priority Data

Nov. 4, 2008 (GB) .................................. 0820182.4

(51) Int. Cl.
*H04W 4/00* (2018.01)
*H04W 48/14* (2009.01)
(Continued)

(52) U.S. Cl.
CPC ........... *H04W 48/14* (2013.01); *H04L 63/101* (2013.01); *H04W 8/04* (2013.01); *H04W 12/08* (2013.01);
(Continued)

(58) Field of Classification Search
CPC ....... H04W 48/14; H04W 8/04; H04W 12/08; H04W 60/00; H04W 60/04; H04W 88/08; H04L 63/101; H04M 1/72519
(Continued)

(56) References Cited

U.S. PATENT DOCUMENTS

| 6,965,580 B1 | 11/2005 | Takagi et al. |
| 8,036,656 B2 | 10/2011 | Jeong et al. |

(Continued)

FOREIGN PATENT DOCUMENTS

| CA | 2619651 A1 | 11/2007 |
| CN | 101047709 A | 10/2007 |

(Continued)

OTHER PUBLICATIONS

Communication dated Apr. 10, 2019 from the National Intellectual Property Administration of the P.R.C. in counterpart Application No. 201610342107.3.

(Continued)

*Primary Examiner* — Danh C Le
(74) *Attorney, Agent, or Firm* — Sughrue Mion, PLLC

(57) ABSTRACT

A communication apparatus which communicates with a base station, the communication apparatus includes a receiving circuit configured to receive a message from the base station, wherein the message includes at least information identifying if the base station is a hybrid access mode base station; and a transmission circuit configured to transmit a parameter which identifies a user equipment to the base station when the base station is the hybrid access mode base station.

4 Claims, 6 Drawing Sheets

Related U.S. Application Data continuation of application No. 14/694,733, filed on Apr. 23, 2015, now Pat. No. 9,807,678, which is a continuation of application No. 13/854,785, filed on Apr. 1, 2013, now Pat. No. 9,037,138, which is a division of application No. 12/998,472, filed as application No. PCT/JP2009/069020 on Nov. 2, 2009, now Pat. No. 8,417,241.

(51) Int. Cl.
*H04L 29/06* (2006.01)
*H04W 12/08* (2009.01)
*H04W 60/00* (2009.01)
*H04W 8/04* (2009.01)
*H04W 60/04* (2009.01)
*H04M 1/725* (2006.01)
*H04W 8/06* (2009.01)
*H04W 84/04* (2009.01)
*H04W 88/08* (2009.01)

(52) U.S. Cl.
CPC ........... *H04W 60/00* (2013.01); *H04W 60/04* (2013.01); *H04M 1/72519* (2013.01); *H04W 8/06* (2013.01); *H04W 84/045* (2013.01); *H04W 88/08* (2013.01)

(58) Field of Classification Search
USPC ............ 455/435.1, 550.1, 561, 418; 370/328
See application file for complete search history.

(56) References Cited

U.S. PATENT DOCUMENTS

| | | | |
|---|---|---|---|
| 8,559,911 B2 | 10/2013 | Wang et al. | |
| 8,934,850 B1 | 1/2015 | Wu et al. | |
| 8,965,338 B2 | 2/2015 | Luft et al. | |
| 2002/0111167 A1 | 8/2002 | Nguyen et al. | |
| 2002/0151300 A1 | 10/2002 | Suda et al. | |
| 2004/0264463 A1 | 12/2004 | Fukushima et al. | |
| 2006/0153134 A1 | 6/2006 | Lee et al. | |
| 2008/0076412 A1 | 3/2008 | Khetawat et al. | |
| 2008/0076425 A1 | 3/2008 | Khetawat et al. | |
| 2008/0093252 A1 | 4/2008 | Hession | |
| 2008/0155607 A1 | 6/2008 | Klappert | |
| 2008/0212511 A1 | 9/2008 | Sawada et al. | |
| 2008/0233966 A1 | 9/2008 | Scheim et al. | |
| 2008/0263600 A1 | 10/2008 | Olague et al. | |
| 2008/0267153 A1 | 10/2008 | Mukherjee et al. | |
| 2008/0280620 A1* | 11/2008 | Chin .................... | H04W 48/08 455/446 |
| 2009/0047968 A1 | 2/2009 | Gunnarsson et al. | |
| 2009/0070694 A1* | 3/2009 | Ore ...................... | H04W 12/08 715/764 |
| 2009/0086672 A1 | 4/2009 | Gholmieh et al. | |
| 2009/0088131 A1 | 4/2009 | Gholmieh et al. | |
| 2009/0092081 A1 | 4/2009 | Balasubramanian et al. | |
| 2009/0092096 A1 | 4/2009 | Czaja et al. | |
| 2009/0094351 A1 | 4/2009 | Gupta et al. | |
| 2009/0094680 A1 | 4/2009 | Gupta et al. | |
| 2009/0170426 A1* | 7/2009 | Jung ....................... | H04W 8/24 455/7 |
| 2009/0305671 A1* | 12/2009 | Luft ................... | G06Q 30/0205 455/411 |
| 2010/0041401 A1 | 2/2010 | Moore | |
| 2010/0077459 A1 | 3/2010 | Mahdi et al. | |
| 2010/0093358 A1 | 4/2010 | Cheong et al. | |
| 2010/0112980 A1 | 5/2010 | Horn et al. | |
| 2010/0112982 A1 | 5/2010 | Signh et al. | |
| 2010/0190498 A1 | 7/2010 | Ha et al. | |
| 2010/0235634 A1* | 9/2010 | Fischer ................ | H04W 12/04 713/168 |
| 2010/0275086 A1* | 10/2010 | Bergquist ............. | H04L 1/1812 714/748 |
| 2010/0279684 A1 | 11/2010 | Salkintzis | |
| 2010/0309836 A1* | 12/2010 | Sugawara ............ | H04W 72/1231 370/312 |
| 2010/0312906 A1 | 12/2010 | Van Gassel et al. | |
| 2010/0323736 A1* | 12/2010 | Fischer ............... | H04W 74/004 455/509 |
| 2011/0019612 A1 | 1/2011 | Grayson et al. | |
| 2011/0164528 A1* | 7/2011 | Johansson ............. | H04L 1/0019 370/252 |
| 2011/0177814 A1 | 7/2011 | Buchmayer et al. | |
| 2013/0203414 A1* | 8/2013 | Zong ..................... | H04W 60/00 455/435.1 |

FOREIGN PATENT DOCUMENTS

| | | |
|---|---|---|
| CN | 101291249 A | 10/2008 |
| CN | 101291519 A | 10/2008 |
| CN | 102204294 B | 8/2016 |
| EP | 1241903 A2 | 9/2002 |
| WO | 2007040449 A1 | 4/2007 |
| WO | 2008096162 A | 8/2008 |
| WO | 2009149431 A1 | 12/2009 |

OTHER PUBLICATIONS

3GPP TSG RAN WG3, R3-081789, Jeju Island, Korea, Aug. 18-22, 2008 Alcatel-Lucent, Airvana, Thomson, Kineto, "UE Registration & Signalling Connection Establishment", pp. 1-4.
Communication dated Dec. 27, 2016 from the Japanese Patent Office in counterpart Application No. 2016-029872.
Communication dated Jan. 8, 2016 from the United States Patent and Trademark Office issued in corresponding U.S. Appl. No. 14/460,254.
Huawei, 3GPP TSG RAN WG3 Meeting # 3G HNB Ad Hoc, R3-082886, "3G HNB Registration Procedure", Vienna, Austria, Oct. 21-22, 2008, pp. 1-7.
NEC, "HNB Capability information indication to the HNB-GW" [online], 3GPP TSG-RAN WG3#62 R3-083022, Nov. 10-14, 2008, Internet <URL:http://www.3gpp.org/ftp/tsg_ran/WG3_Iu/TSGR3_62/docs/R3-083022.zip>. (4 pgs. total).
Vodafone, "Support of Hybrid Mode CSG Cells in UTRAN" [online], 3GPP TSG-RAN WG2#64 R2-086462, Nov. 10-14, 2008, Internet <URL:http://www.3gpp.org/ftp/tsg_ran/WG2_RL2/TSGR2_64/Docs/R2-086462.zip>. (4 pgs. total).
Qualcomm Europe, "Support for Open/Closed/Hybrid Access Mode H(e)NBs in CT1" [online], 3GPP TSG-CT WG1 Meeting #56, C1-084841, Nov. 10-14, 2008, Internet <URL:http://www.3gpp.org/ftp/tsg_ct/WG1_mm-cc-sm_ex-CN1/TSGC1_56/Docs/C1-084841.zip>. (3 pgs. total).
"3rd Generation Partnership Project; Technical Specification Group Radio Access Network; UTRAN architecture for 3G Home NodeB; Stage 2 (Release 8)" [online], 3GPP TS 25.467 V0.0.1 (Sep. 2008), adhoc RAN3_HNB_adhoc_Oct. 2008 R3-082921, Oct. 22, 2008, Internet<URL:http://www.3gpp.org/tfp/tsg_ran/VVG3Iu/TSGR3AHGs/RAN3HNBadhoc_October2008/docs/R3-082921.zip>. (20 pgs. total).
United States Office Action dated Jun. 26, 2015 in U.S. Appl. No. 14/460,254.
Communication dated Nov. 11, 2015 from the Japanese Patent Office issued in corresponding application No. 2015-002040.
Chinese Office Action dated Apr. 3, 2013, with English translation of Chinese Search Report.
U.S. Office Action dated Jun. 23, 2014, and U.S. Appl. No. 13/854,785.
Non-Final Office Action dated Sep. 29, 2014 in co-pending U.S. Appl. No. 13/854,785.
Notice of Allowance dated Jan. 21, 2015 in co-pending U.S. Appl. No. 13/854,785.
3GPP TR R3.020 V09.0 (Sep. 2008) "3rd Generation Partnership Project; Technical Specification Group Radio Access Network; Home (e) NodeB; Network aspects (Release 8)". Internet (httb://www.3gbp.orq).
Japanese Office Action dated Jun. 13, 2012.

(56) References Cited

OTHER PUBLICATIONS

3GPP TSG RAN WG3 Meeting #3G HNB Ad Hoc R3-082887, "UE Registration Procedure", Huawei, Oct. 22, 2008.
3GPP TSG RAN WG3 Ad Hoc R3-081688, "UE Registration and Access Control for UTRA HNBs" Qualcomm Europe, Jun. 12, 2008.
3GPP TSG SA1 #42 S1-083461, "LS on HNB/HeNB Open Access Mode", 3GPP SA WG1, Oct. 17, 2008.
Communication dated Sep. 4, 2017 from the State Intellectual Property Office of the P.R.C. in counterpart Application No. 201410722691.6.
Communication dated Aug. 28, 2018 from the State Intellectual Property Office of the P.R.C. In counterpart Chinese application No. 201610342311.5.

* cited by examiner

COMMUNICATIONS SYSTEM

The application is a Continuation of U.S. patent application Ser. No. 15/699,864 filed Sep. 8, 2017, which is a Continuation Application of U.S. patent application Ser. No. 14/694,733 filed Apr. 23, 2015, issued as U.S. Pat. No. 9,807,678 on Oct. 31, 2017, which is a Continuation Application of U.S. patent application Ser. No. 13/854,785, filed Apr. 1, 2013, issued as U.S. Pat. No. 9,037,138 on May 19, 2015, which is a Divisional Application of U.S. patent application Ser. No. 12/998,472, filed on Apr. 25, 2011, issued as U.S. Pat. No. 8,417,241 on Apr. 9, 2013, which is a National Stage of International Application No. PCT/JP2009/069020, filed on Nov. 2, 2009, which is based on and claims priority from United Kingdom Patent Application No. 0820182.4, filed on Nov. 4, 2008, the entire contents of which is incorporated herein by reference.

TECHNICAL FIELD

The present invention relates to mobile telecommunication networks, particularly but not exclusively networks operating according to the 3GPP standards or equivalents or derivatives thereof. The invention has particular although not exclusive relevance to the interface between a home base station and a home base station gateway device.

BACKGROUND ART

Under the 3GPP standards, a NodeB (or an eNB in LTE) is the base station via which mobile devices connect to the core network. Recently the 3GPP standards body has adopted an official architecture and started work on a new standard for home base stations (HNB). Where the home base station is operating in accordance with the LTE standard, the HNB is sometimes referred to as a HeNB. However, for simplicity, we will just use the term HNB in the following description. The HNB will provide radio coverage (3G/4G) within the home and will connect to the mobile network via a suitable public network (for example via an ADSL link to the Internet) and an HNB gateway (HNB-GW). As part of this standard setting process, the registration procedure between the HNB and the HNB-GW has been agreed.

It has also been agreed that an access control mechanism is mandatory at the HNB-GW whereas it is optionally provided for pre-release 8 User Equipment (UE) at the HNB. Further, with the various evolving scenarios of HNB deployments, it is recognised that the HNB could operate with different access control mechanisms, namely "Open", "Closed" and "Hybrid". As will be appreciated by those skilled in the art, if the HNB is open, then the mandatory access control at the HNB-GW is not required for pre-release 8 UEs. If the HNB is hybrid, then the mandatory access control at the HNB-GW may not required for pre-release 8 UEs.

Although for efficiency of understanding for those of skill in the art, the invention will be described in detail in the context of a 3G system, the principles of the invention can be applied to other systems in which mobile devices or User Equipment (UE) communicate with one of several base stations with the corresponding elements of the system changed as required.

DISCLOSURE OF INVENTION

Embodiments of the present invention aim to address one or more of the above problems by making the HNB provide capability information to the HNB-GW.

According to one aspect, the present invention provides a method performed by a gateway device, the method comprising: receiving a request to register a mobile communications device from a home base station; determining if the home base station is an open access mode or a closed access mode home base station; performing access control for said mobile communications device if said determining step determines that the home base station is a closed mode home base station and registering the mobile telephone with the gateway device if access control succeeds; registering the mobile telephone with the gateway device, without performing access control, if said determining step determines that the home base station is an open mode home base station; and sending a registration accept message to the home base station if registration of the mobile communication device is accepted.

In one embodiment, the gateway determines if the home base station is an open or a closed access mode home base station based on information received from the home base station, for example in a registration request. The information may be defined by the presence or absence of an optional element within the home base station registration request. For example, by the presence or absence of an Access Control List within the home base station registration request, such that if the Access Control List is present, then the gateway device determines that the home base station is a closed access home base station and if the Access Control List is absent, then the gateway device determines that the home base station is an open access home base station.

Alternatively the information may be defined by the contents of a mandatory element within the home base station registration request. For example, by the presence or absence of entries within said mandatory element. In one embodiment, the data is defined by the presence or absence of entries within a mandatory Access Control List within the home base station registration request, such that if the Access Control List includes one or more entries, then the gateway device determines that the home base station is a closed access home base station and if the Access Control List is empty, then the gateway device determines that the home base station is an open access home base station.

The access mode of the home base station may be open, closed or hybrid and the gateway may treat hybrid access mode home base stations as open access mode home base stations or as closed access mode home base stations or as both open and closed access mode home base stations. In one embodiment, the mandatory element defines if the home base station is an open access home base station, a closed access home base station or a hybrid access home base station.

If the home base station is a hybrid access home base station, the method may comprise performing access control for the mobile communications device and if it succeeds registering the mobile telephone with the gateway device and generating data identifying that the mobile communications device is part of a closed subscriber group associated with the home base station; and if access control does not succeed registering the mobile telephone with the gateway device and generating data identifying that the mobile communications device is not part of a closed subscriber group associated with the home base station.

In another embodiment, the gateway determines if the home base station is an open or a closed access mode home base station based on data stored within a central database, such as an Operations and Management database.

The present invention also provides a method performed by a home base station, the method comprising: sending the gateway device data identifying whether or not the home base station is an open access mode or a closed access mode home base station; receiving a request from a mobile communications device; transmitting a registration request for the mobile communications device to the gateway device; and receiving a registration accept message from the gateway device if registration of the mobile communication device is accepted.

The home base station may include the data within a home base station registration request message transmitted by the home base station.

In one embodiment, the data is defined by the presence or absence of an optional element within the home base station registration request. For example, the data may be defined by the presence or absence of an Access Control List within the home base station registration request, such that if the home base station is a closed access home base station then the home access base station includes the Access Control List in the home base station registration request and if the home base station is an open access home base station then the home access base station does not include the Access Control List in the home base station registration request.

In another embodiment, the data may be defined by the contents of a mandatory element within the home base station registration request. For example, the data may be defined by the presence or absence of entries within said mandatory element. For example, the data may be defined by the presence or absence of entries within a mandatory Access Control List within the home base station registration request, such that if the home base station is a closed access home base station then the home access base station includes the entries within the Access Control List in the home base station registration request and if the home base station is an open access home base station then the home access base station does not include entries within the Access Control List in the home base station registration request.

In a further embodiment, the mandatory element may define if the home base station is an open access home base station, a closed access home base station or a hybrid access home base station.

The present invention also provides corresponding gateway devices and home base stations. The invention also provides a message comprising data identifying whether or not the home base station is an open access mode or a closed access mode home base station.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An embodiment of the invention will now be described, by way of example, with reference to the accompanying drawings in which.

BEST MODE FOR CARRYING OUT THE INVENTION

Overview

Figure 1:
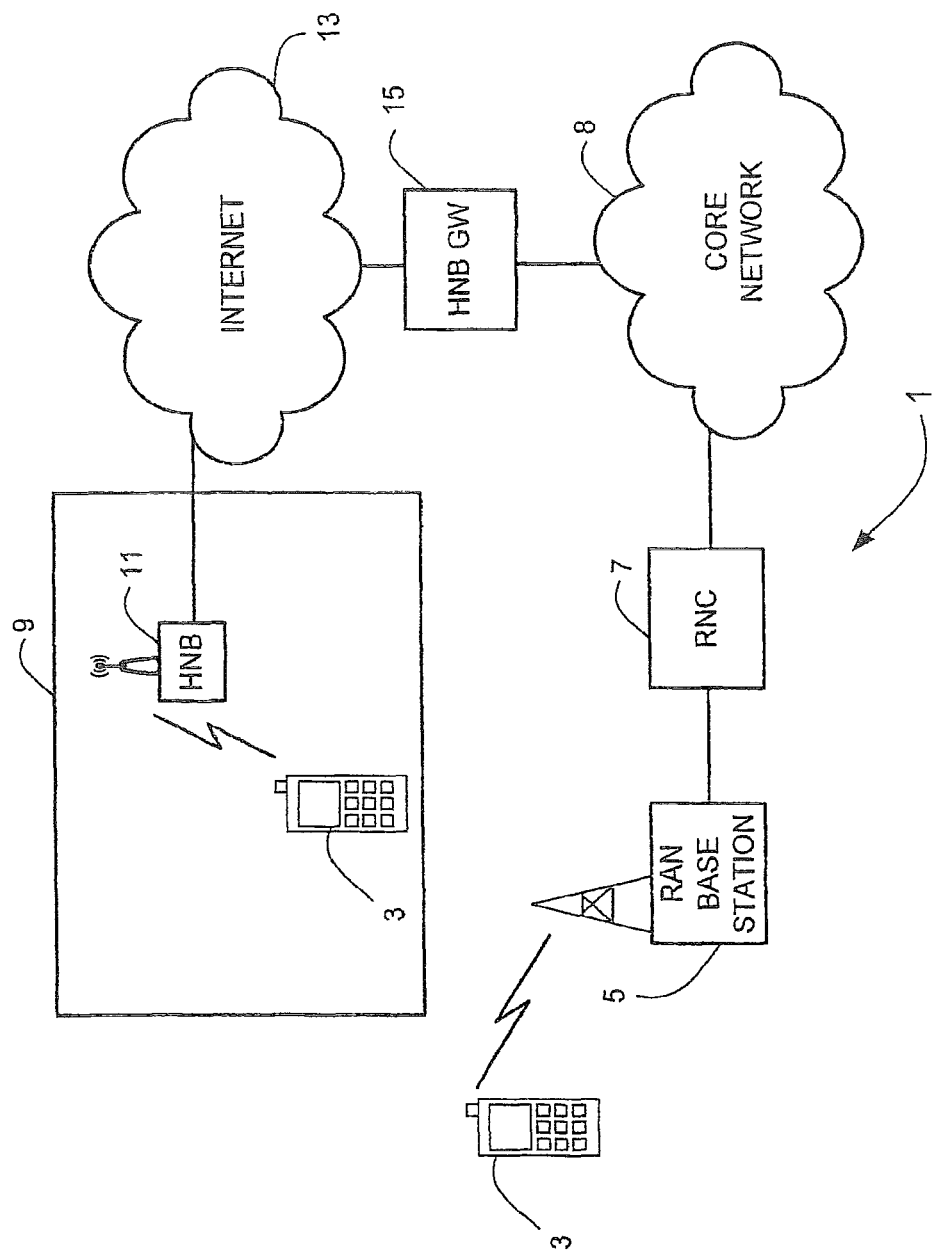
FIG. 1 schematically illustrates a mobile telecommunication system of a type to which the embodiment is applicable.

FIG. 1 schematically illustrates a mobile (cellular) telecommunication system 1 in which a user of a mobile telephone (MT) 3 can communicate with other users (not shown) via a 3G Radio Access Network (RAN) base station 5, a Radio Network Controller 7 and a core telephone network 8 when the user is away from home 9; and which can communicate with other users (not shown) via a home base station (HNB) 11, the Internet 13, a home base station gateway (HNB-GW) 15 and the core telephone network 8 when the user is at home 9. The HNB 11 will typically connect to the HNB-GW 15 via a suitable residential Internet connection such as an ADSL or cable connection.

Mobile Telephone

Figure 2:
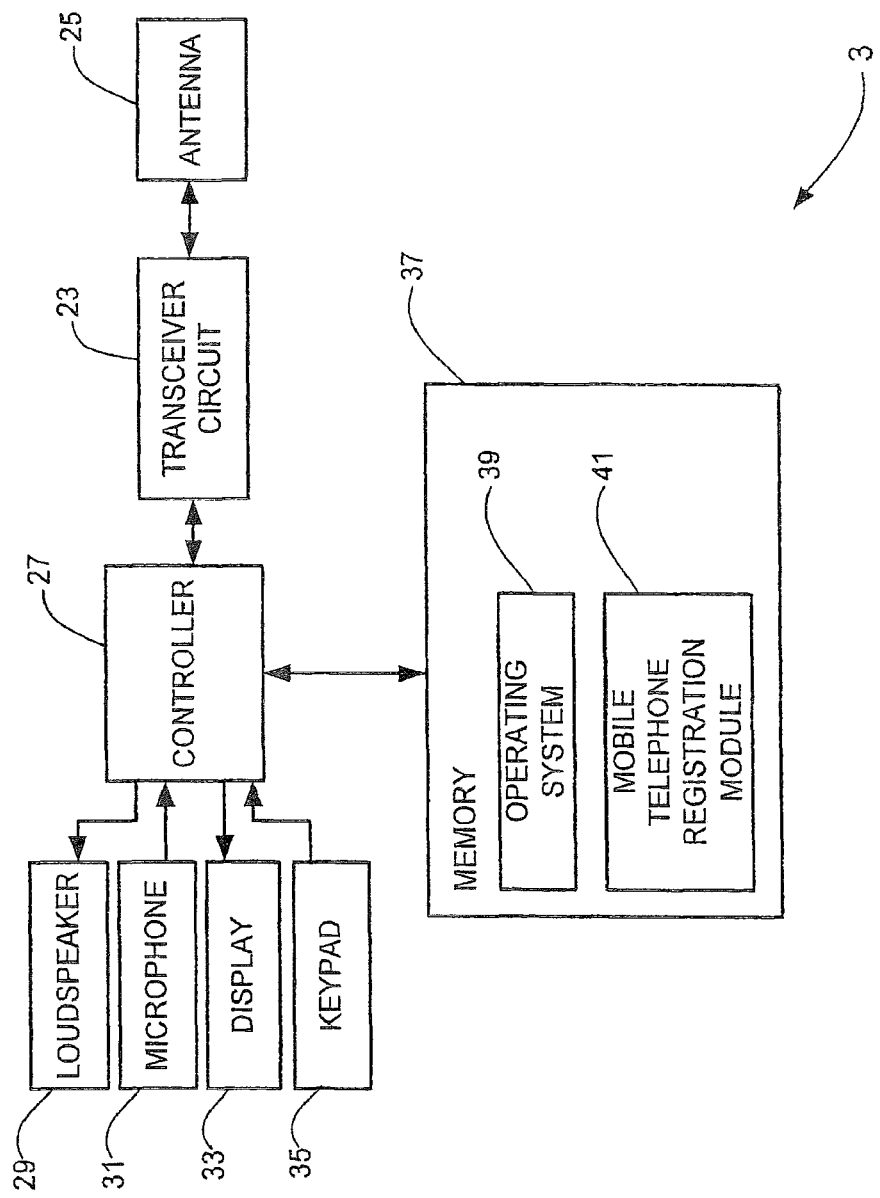
FIG. 2 is a block diagram of a mobile telephone forming part of the system shown in FIG. 1.

FIG. 2 schematically illustrates the main components of the mobile telephone 3 shown in FIG. 1. As shown, the mobile telephone 3 includes a transceiver circuit 23 which is operable to transmit signals to and to receive signals from the RAN base station 5 or the HNB 11 via one or more antennae 25. As shown, the mobile telephone 3 also includes a controller 27 which controls the operation of the mobile telephone 3 and which is connected to the transceiver circuit 23 and to a loudspeaker 29, a microphone 31, a display 33, and a keypad 35. The controller 27 operates in accordance with software instructions stored within memory 37. As shown, these software instructions include, among other things, an operating system 39 and a mobile telephone registration module 41. In this embodiment, the mobile telephone registration module 41 allows the user to select the home base station 11 with which the mobile telephone 3 will register when the user is at home or when they are within range of their HNB 11. The selection may be automatic or manually controlled by the user.

Home Base Station

Figure 3:
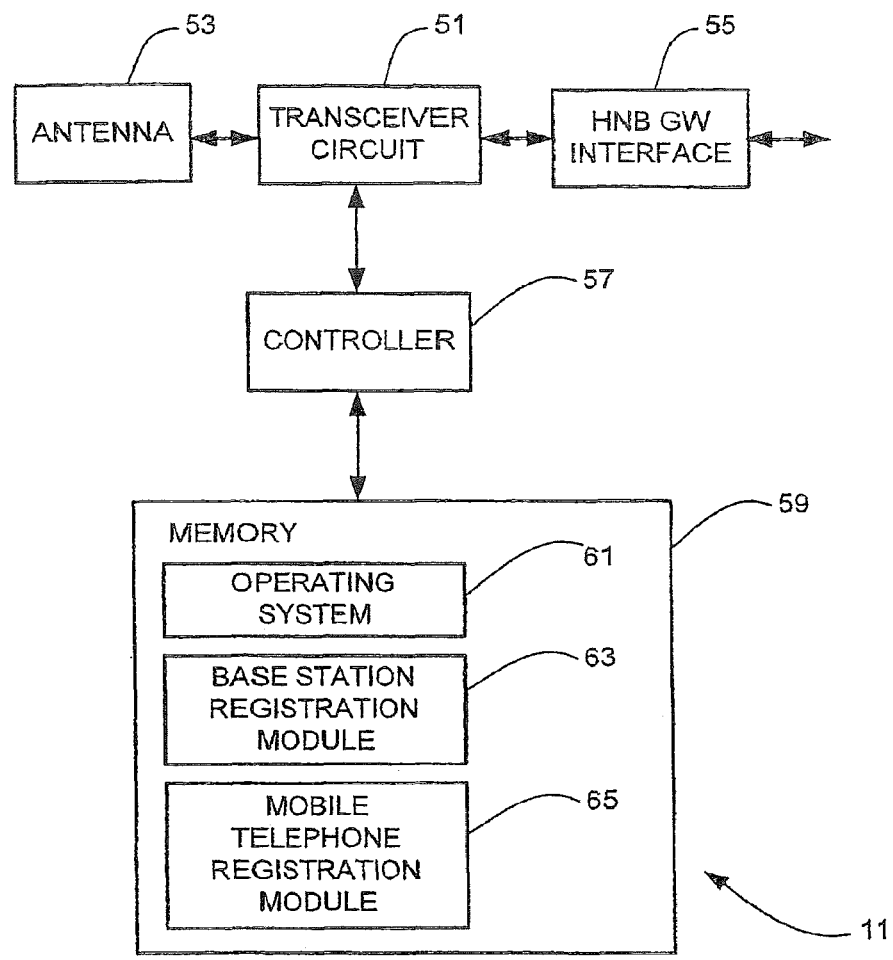
FIG. 3 is a block diagram of a home base station forming part of the system shown in FIG. 1.

FIG. 3 is a block diagram illustrating the main components of the home base station (HNB) 11 shown in FIG. 1. As shown, the HNB 11 includes a transceiver circuit 51 which is operable to transmit signals to, and to receive signals from, the mobile telephone 3 via one or more antennae 53 and which is operable to transmit signals to and to receive signals from the HNB-GW 15 via a HNB-GW interface 55. The operation of the transceiver circuit 51 is controlled by a controller 57 in accordance with software stored in memory 59. The software stored in memory 59 includes, among other things, an operating system 61, a base station registration module 63 and a telephone registration module 65. The base station registration module 63 is operable to register the HNB with the HNB-GW 15 and the mobile telephone registration module 65 is operable to register the mobile telephone 3 with itself and with the HNB-GW 15.

HNB Gateway

Figure 4:
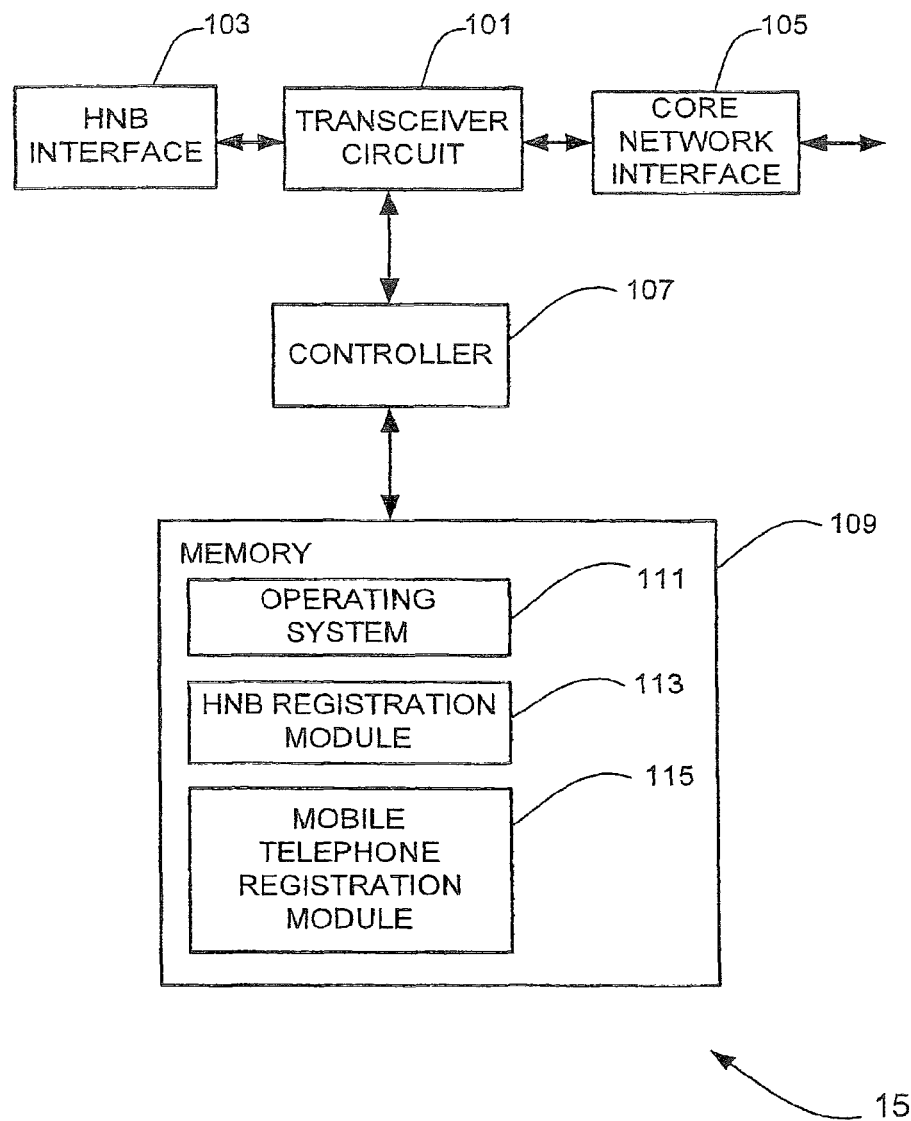
FIG. 4 is a block diagram of a home base station gateway forming part of the system shown in FIG. 1.

FIG. 4 is a block diagram illustrating the main components of the HNB gateway (HNB-GW) 15 shown in FIG. 1. As shown, the HNB-GW 15 includes a transceiver circuit 101 which is operable to transmit signals to, and to receive signals from, the HNB 11 via the HNB interface 103 and which is operable to transmit signals to and to receive signals from the core network 8 via a core network interface 105. The operation of the transceiver circuit 101 is controlled by a controller 107 in accordance with software stored in memory 109. The software stored in memory 109 includes, among other things, an operating system 111, an HNB registration module 113 and a mobile telephone registration module 115. The HNB registration module 113 is operable to control the registration of the HNB 11 and the mobile telephone registration module is operable to control the register the mobile telephone 3 and to perform access control as required.

In the above description, the mobile telephone 3, the base station 5 and the HNB gateway 15 are described for ease of understanding as having a number of discrete modules (such as the registration modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Access Control

As mentioned above, three different types of mode of access are defined for the HNB 11:

Open access mode: HNB operates as a normal cell via which any mobile telephone 3 can make and receive calls;

Closed access mode: HNB operates as a Closed Subscriber Group (CSG) cell in which only CSG members are allowed access (this is the mode as defined in Rel-8); and Hybrid access mode: a CSG cell where at the same time, non-CSG members are allowed access.

Although the Hybrid access mode is designed for release-9, operators would like to recommend that hybrid access mode is implemented in release 8 if it does not affect the Release8 timescale:

As will be appreciated, for HNBs 11 operating in the closed access mode, the HNB-GW 15 must perform access control to restrict access to the core network 8 to only those mobile telephones 3 belonging to the respective subscriber groups; whereas for HNBs 11 operating in the open mode, there is no need for the HNB-GW 15 to perform access control; and for HNBs 11 operating in the hybrid mode, there may be no need for the HNB-GW 15 to perform access control. Therefore, in this embodiment, the HNB 11 informs the HNB-GW 15 about its access mode capability, so that the HNB-GW 15 can determine whether or not to perform access control for a mobile telephone 3 seeking to register through that HNB 11.

A number of techniques will now be described for the HNB 11 to signal its access mode capability to the HNB-GW 15.

HNB Registration Procedure

Figure 5:
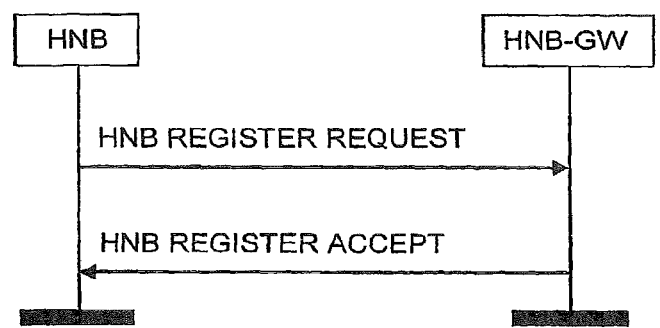
FIG. 5 is a timing diagram illustrating a registration procedure for registering the home base station with the home base station gateway.

The purpose of the HNB Registration Procedure is to register the HNB 11 with the HNB-GW 15 to enable the HNB-GW to provide service and core network connectivity for the HNB 11. The general process is illustrated in FIG. 5. As shown, the process involves the HNB 11 sending the HNB-GW an HNB REGISTER REQUEST message and the HNB-GW 15 sending an HNB REGISTER ACCEPT message in response. There are a number of different options for signalling the access mode capability of the HNB 11 to the HNB-GW 15.

Option 1: The HNB-GW 15 can infer the access mode of the HNB 11 based on the Access Control List Information Element (IE). Therefore, it is proposed to include an optional Access Control List IE in the HNBAP HNB REGISTER REQUEST message sent from the HNB 11 to the HNB-GW 15. If the HNB 11 is closed access mode then it will include the optional Access Control List IE in the HNBAP REGISTER REQUEST message; otherwise if the HNB is open or hybrid access mode, then it will not include the optional Access Control list IE in the HNBAP HNB REGISTER REQUEST message. Therefore, a new Access Control List IE needs to be included in the HNBAP HNB REGISTER REQUEST message.

HNB Register Request

| PARAMETER | PRESENCE | RANGE | IE Type and Reference | Semantics Description | Criticality | Assigned Criticality |
|---|---|---|---|---|---|---|
| Message Type | M | | 9.2.1 | | yes | Reject |
| HNB Identity | M | | 9.2.2 | | Yes | Reject |
| HNB Location Information | M | | 9.2.3 | | Yes | Reject |
| Access Control List | O | | 9.2.x | If this IE is included, then the access mode of the HNB is considered as "Closed", else "Open". (Note 1) | Yes | Ignore |
| PLMN-ID | M | | 9.2.14 | | yes | Reject |
| Cell-ID | M | | 9.2.25 | | Yes | Reject |
| LAC | M | | 9.2.11 | | Yes | Reject |
| RAC | M | | 9.2.12 | | Yes | Reject |
| SAC | M | | 9.2.13 | | Yes | Reject |

This message is sent by the HNB 11 to the HNB-GW 15 to register the HNB 11 at the HNB-GW 15.

Direction: HNB→HNB-GW 9.2.x Access Control List

| IE/Group Name | Presence | Range | IE type and reference | Semantics description |
|---|---|---|---|---|
| Access Control | | 0 . . . maxUEs | | If this list is empty, then the ACL is |

-continued

| IE/Group Name | Presence | Range | IE type and reference | Semantics description |
|---|---|---|---|---|
| List > IMSI | M | | IMSI 9.2.10 | considered as empty. |

Note 1: The above option assumes that the TINB-GW 15 treats open access HNBs and hybrid access HNBs the same and that therefore, hybrid HNBs do not need to inform the HNB-GW 15 about their Access Control List. It is currently not clear in the standards whether or not this assumption is valid. Consequently, if the HNB-GW 15 does needs to have the Access Control List of the hybrid HNB, then this option will not work.

Note 2: It is not clear in the current standards documentation if it is possible to have a closed mode HNB with no IMSI (International Mobile Subscriber Identity) in the Access Control List (ie an empty Access Control List). If it is assumed that a closed HNB cannot have an empty Access Control List, then the presence of the Access Control List IE should be made mandatory (rather than optional as suggested above) in the HNBAP HNB REGISTER REQUEST message. In this way, if the HNB-GW 15 receives an empty Access Control List IE in the HNBAP HNB REGISTER REQUEST, then the HNB-GW 15 can infer that the HNB 11 is an open access mode; otherwise, if at least one entry is present in the Access Control List IE, then the HNB-GW can determine that the HNB 11 is a closed mode HNB.

Option 2: The HNB 11 can indicate its capability (Open, Closed or Hybrid) to the HNB-GW 15 during the HNB Registration procedure in the HNBAP HNB REGISTER REQUEST message by using a new HNB Capability Information IE, as shown in the table below.

HNB Register Request

| PARAMETER | PRESENCE | RANGE | IE Type and Reference | Semantics Description | Criticality | Assigned Criticality |
|---|---|---|---|---|---|---|
| Message Type | M | | 9.2.1 | | Yes | Reject |
| HNB Identity | M | | 9.2.2 | | Yes | Reject |
| HNB Location Information | M | | 9.2.3 | | Yes | Reject |
| HNB Capability Information | M | | 9.2.y | | Yes | Reject |
| PLMN-ID | M | | 9.2.14 | | Yes | Reject |
| Cell-ID | M | | 9.2.25 | | Yes | Reject |
| LAC | M | | 9.2.11 | | Yes | Reject |
| RAC | M | | 9.2.12 | | Yes | Reject |
| SAC | M | | 9.2.13 | | Yes | Reject |

9.2.y HNB Capability Information

HNB Capability Information IE is sent from the HNB to HNB-GW to provide information on the capability of the HNB.

| IE/GROUP NAME | PRESENCE | RANGE | IE Type and Reference | Semantics Description |
|---|---|---|---|---|
| HNB Capability Information > Access control type | M | (Open, Closed, Hybrid) | | |

Option 3: The OAM (Operations and Maintenance) functionality for the HNB-GW 15 stores the HNB access mode for each HNB 11. Upon successful HNB Registration at the HNB-GW 15, the HNB-GW 15 retrieves the HNB access mode from the OAM database (not shown) and performs the access control accordingly.

UE Registration Procedure

Based on the possible options described above, the HNB-GW 15 will know the HNB access control mode during the HNB Registration procedure. The HNB-GW 15 will store this information for further use, until either the HNB 11 deregisters itself or updates this information via another HNBAP procedure. In one embodiment, the mobile telephone registration (illustrated in FIG. 6) shall be performed using the following steps:

1. Upon camping on the HNB 11, the mobile telephone (MT) 3 initiates an initial NAS procedure (e.g. LU Procedure) by establishing an RRC connection with the HNB 11.
2. The MT 3 then transmits an RRC Initial Direct Transfer message carrying the initial NAS message (e.g. Location Updating Request message) with NAS level identity (IMSI or TMSI, P-TMSI etc. . . . ).
3. The HNB 11 initiates MT 3 registration towards the HNB-GW 15. If HNB 11 is closed or hybrid access mode then before starting the mobile telephone Registration procedure, the HNB performs the NAS COMMON ID procedure in order to get the IMSI for the mobile telephone 3, if such identity is not received in the RRC Connection Establishment or Initial Direct Transfer message.
4. HNB 11 may optionally perform access control based on IMSI and access control list.
5. The 3G HNB 11 attempts to register the mobile telephone 3 on the HNB-GW 15 by transmitting the HNBAP UE REGISTER REQUEST, containing the mobile telephone identity (IMSI in case of a closed/hybrid access HNB, or TMSI/IMSI in case of an open access HNB).
6. If the HNB 11 is open access mode then the HNB-GW 15 shall accept the mobile telephone 3 registration and allocate a context-id for the mobile telephone 3.
7. If the HNB 11 is closed access mode then the HNB-GW 15 shall perform access control for the particular mobile telephone 3 attempting to utilize the specific 3G HNB.
8. If the HNB 11 is hybrid access mode then the HNB-GW 15 shall perform access control for the particular mobile telephone 3 attempting to utilize the specific 3G HNB. If the access control succeeds, then the HNB-GW 15 accepts the registration of the mobile telephone 3 and allocates a context-id for the mobile telephone 3. In this case, the mobile telephone 3 is considered as a CSG mobile telephone. This information is stored and could be used for purposes such as service differentiation etc. On the other hand, if the access control fails, then the HNB-GW 15 still accepts the registration of the mobile telephone 3 and allocates a context-id for the mobile telephone 3. However, in this case the mobile telephone 3 is considered as a non-CSG mobile telephone (which information is stored and could be used for purposes such as service differentiation etc).

9. If the HNB-GW accepts the mobile telephone registration request then the HNB-GW shall send the UE REGISTRATION ACCEPT message to the HNB including the unique context id.

10. Upon successful completion of the mobile telephone Registration Request message, the HNB 11 sends a CONNECT message containing the RANAP Initial UE message.

11. Upon the reception of the RUA CONNECT message, the HNB-GW 15 performs the SCCP Connection establishment towards the core network 8. HNB-GW 15 may include the Initial UE Message in the SCCP CR message. Alternatively, the HNB-GW 15 sends the Initial UE Message upon successful establishment of SCCP connection establishment.

Modifications and Alternatives

A detailed embodiment has been described above. As those skilled in the art will appreciate, a number of modifications and alternatives can be made to the above embodiment whilst still benefiting from the inventions embodied therein.

In the above embodiment, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

1 Introduction

During the recent RAN #3 meetings, the HNB registration procedure has been agreed and captured in the Stage-2 document. The list of IEs sent from the HNB to HNB-GW in the HNB REGISTER REQUEST message is currently discussed and some IEs [2] have been already agreed. This contribution discusses the HNB capability information to be included in the HNB REGISTER REQUEST message.

It is assumed that pre-release-8 UEs will remain exist in the actual field for quite long time. Therefore, the network has to support pre-release-8 and CSG UEs simultaneously. Also, It is already agreed that access control mechanism is mandatory at the HNB-GW whereas optional at the HNB for pre-release-8 UEs. Moreover, with the evolving scenarios of HNB deployments, it is realized the HNB could be operated with different access control mechanisms, namely "Open", "Closed" and "Hybrid". Such agreement is already made in SA1 [1]. As clear, if the HNB is open or hybrid access, then mandatory access control at HNB-GW is not required for pre-release-8 UEs. Therefore, for efficient working already it is necessary that the HNB access mode capability should be known to the HNB-GW.

2 Discussion 4.1. 2.1 Background

As mentioned in [1], three different types of mode of access are defined for HNB/HeNB.

Open access mode: HNB/HeNB operates as a normal cell, i.e. non-CSG cell.

Closed access mode: HNB/HeNB operates as a CSG cell. This is the mode as defined in Rel-8. This is a CSG cell where only CSG members are allowed access.

Hybrid access mode: a CSG cell where at the same time, non-CSG members are allowed access.

Although the LS reply [1] refers to release-9, it is specifically mentioned that the operators would like to recommend that hybrid access mode is implemented in release 8 if it does not affect the Release-8 timescale.

In order avoid unnecessary access control at HNB-GW when the HNB is open access or hybrid access, the HNB-GW must know the access mode capability of the HNB.

This paper discusses some of the possible solutions in the following sections.

2.2 HNB Registration Procedure

The purpose of the HNB Registration Procedure is to register the HNB with the HNB-GW to enable the HNB-GW to provide service and core network connectivity for the HNB.

Option 1: The HNB-GW can infer the access mode of the HNB based on the Access Control List IE received from the HNB. Therefore, it is proposed to include the optional Access Control List IE in the HNBAP HNB REGISTER REQUEST message. If the HNB is closed access mode then it will include the optional Access Control List IE in the HNBAP REGISTER REQUEST message; otherwise if the HNB is open access mode, then it will not include the optional Access Control list IE in the HNBAP HNB REGISTER REQUEST message. Therefore, new Access Control List IE needs to be included in the HNBAP HNB REGISTER REQUEST message.

4.2. HNB Register Request

This message is sent by the HNB to the HNB-GW to register the HNB at the HNB-GW.

Direction: HNB→HNB-GW

| PARAMETER | PRESENCE | RANGE | IE Type and Reference | Semantics Description | Criticality | Assigned Criticality |
|---|---|---|---|---|---|---|
| Message Type | M | | 9.2.1 | | yes | Reject |
| HNB Identity | M | | 9.2.2 | | Yes | Reject |
| HNB Location Information | M | | 9.2.3 | | Yes | Reject |
| Access Control List | O | | 9.2.x | If this IE is included, then the access mode of the HNB is considered as "Closed", else "Open". (Note 1) | Yes | Ignore |
| PLMN-ID | M | | 9.2.14 | | yes | reject |
| Cell-ID | M | | 9.2.25 | | Yes | reject |
| LAC | M | | 9.2.11 | | Yes | Reject |
| RAC | M | | 9.2.12 | | Yes | reject |
| SAC | M | | 9.2.13 | | Yes | Reject |

Note 1: It is assumed that, HNB-GW will need same handling for "Open" and "Hybrid" access mode of operation.

9.2.x Access Control List

| IE/Group Name | Presence | Range | IE type and reference | Semantics description |
|---|---|---|---|---|
| Access Control List | | 0 . . . maxUEs | | If this list is empty, then the ACL is considered as empty. |
| > IMSI | M | | IMSI 9.2.10 | |

Note 1: The above option assumes that from HNB-GW point of view, open access HNB and hybrid access HNB is the same. Therefore, it is not necessary to inform about the ACL for the hybrid mode HNB to the HNB-GW. It is currently not clear in the standards whether the HNBGW needs to have the ACL for hybrid HNB. If the HNB-GW needs to have the ACL of the hybrid HNB, then this option will not work.

Note 2: It is not clear in the specification if it is possible to have closed mode HNB with no IMSI in the ACL. If it is assumed that a closed HNB cannot have an empty ACL, then the Access Control List IE should be mandatory present in the HNBAP HNB REGISTER REQUEST message. Then, if the HNB-GW receives empty Access Control List IE in the HNBAP HNB REGISTER REQUEST, then the IINB is considered as open access mode; otherwise, if at least one entry is present in the Access Control List IE, then the HNB is considered as closed mode HNB.

Option 2: The HNB can indicate its capability during the HNB Registration procedure in the HNBAP HNB REGISTER REQUEST message by using a new HNB Capability Information IE.

| PARAMETER | PRESENCE | RANGE | IE Type and Reference | Semantics Description | Criticality | Assigned Criticality |
|---|---|---|---|---|---|---|
| Message Type | M | | 9.2.1 | | yes | Reject |
| HNB Identity | M | | 9.2.2 | | Yes | Reject |
| HNB Location Information | M | | 9.2.3 | | Yes | Reject |
| HNB Capability Information | M | | 9.2.x | | Yes | Reject |
| PLMN-ID | M | | 9.2.14 | | yes | Reject |
| Cell-ID | M | | 9.2.25 | | Yes | Reject |
| LAC | M | | 9.2.11 | | Yes | Reject |
| RAC | M | | 9.2.12 | | Yes | Reject |
| SAC | M | | 9.2.13 | | Yes | Reject |

4.3. 9.2.y HNB Capability Information

HNB Capability Information IE is sent from the HNB to HNB-GW to provide information on the capability of the HNB.

| IE/GROUP NAME | PRES- ENCE | RANGE | IE Type and Reference | Semantics Description |
|---|---|---|---|---|
| HNB Capability Information | | | | |
| > Access control type | M | | (Open, Closed, Hybrid) | |

Option 3: The OAM for HNB-GW stores the HNB access mode for each HNB. Upon successful HNB Registration at the HNB-GW, the HNB-GW retrieves the HNB access mode from OAM database and performs the access control accordingly.

Figure 6:
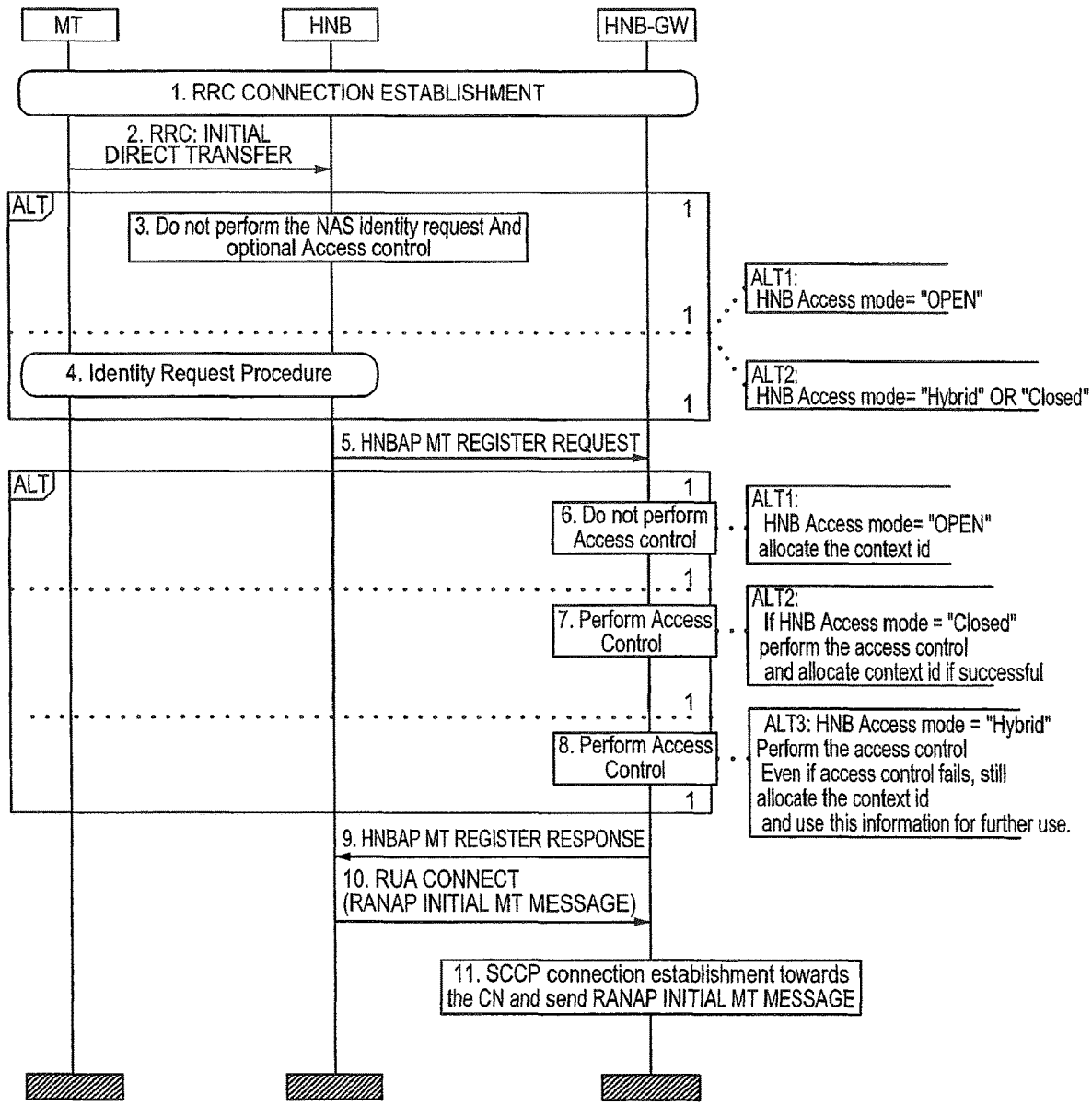
FIG. 6 is a timing diagram illustrating a registration procedure performed when a mobile telephone registers with the home base station gateway.

2.2 UE Registration Procedure:

Based on the possible solutions mentioned in section 2.1, the HNB-GW will know the HNB access control mode during the HNB Registration procedure. The HNB-GW will store this information for further use, until either the IINB deregisters itself or updates this information via another HNBAP procedure. In FIG. 6, UE is used instead of the mobile telephone (TE) 3. The UE registration shall be performed using the following steps;

12. Upon camping on the HNB, the UE initiates an initial NAS procedure (e.g. LU Procedure) by establishing an RRC connection with the HNB.
13. The UE then transmits a RRC Initial Direct Transfer message carrying the initial NAS message (e.g. Location Updating Request message) with NAS level identity (IMSI or TMSI, P-TMSI etc. . . . ).
14. The HNB initiates UE registration towards HNB-GW. If HNB is closed/hybrid access mode then before starting the UE Registration procedure, HNB performs NAS COMMON ID procedure in order to get the UE IMSI, if such identity is not received in the RRC Connection Establishment or Initial Direct Transfer message.
15. HNB may optionally perform access control based on IMSI and access control list.
16. The 3G HNB attempts to register the UE on the HNB-GW by transmitting the HNBAP UE REGISTER REQUEST, containing the UE identity (IMSI in case of closed/hybrid access HNB, or TMSI/IMSI in case of open access mode).
17. If the HNB is open access then the HNB-GW shall accept the UE registration and allocate a context-id for the UE.
18. If the HNB is closed access mode then the HNB-GW shall perform access control for the particular UE attempting to utilize the specific 3G HNB.
19. If the HNB is hybrid access mode then the HNB-GW shall perform access control for the particular UE attempting to utilize the specific 3G HNB. If the access control succeeds, HNB-GW accepts the UE registration and allocates a context-id for the UE. The UE is considered as CSG UE, which could be used for purposes such as service differentiations etc. If the access control fails, still the HNB-GW accepts the UE registration and allocates a context-id for the UE. However, this UE is considered as non-CSG UEs which could be used for purposes such as service differentiations etc.
20. If the HNB-GW accepts UE registration request then the HNB-GW shall send the UE REGISTRATION ACCEPT message to the HNB including the unique context id.
21. Upon successful completion of the UE Registration Request message, the HNB sends a CONNECT message containing the RANAP Initial UE message.
22. Upon the reception of the RUA CONNECT message, the HNB-GW performs the SCCP Connection establishment towards the CN. HNB-GW may include the Initial UE Message in the SCCP CR message. Alternatively, the HNB-GW sends the Initial UE Message upon successful establishment of SCCP connection establishment.

3 Conclusion

Introduce the new HNB Capability Information IE in the HNBAP HNB REGISTER REQUEST message.

This application is based upon and claims the benefit or priority from United Kingdom Patent Application No. 0820182.4, filed on Nov. 4, 2008, the disclosure of which is incorporated herein in its entirety by reference.

The invention claimed is:

1. A user equipment (UE) configured to communicate with a home base station (HNB), which is configured to communicate with a home base station gateway (HNB-GW), the UE comprising:
   a controller; and
   a transceiver,
   wherein the controller is configured to control the transceiver to establish a Radio Resource Control (RRC) connection with the HNB and to transmit a message carrying an initial non-access stratum (NAS) message to the HNB comprising a UE identity,
   wherein the HNB is configured to transmit, to the HNB-GW as part of a HNB registration procedure, a HNB register request message,
   wherein the HNB register request message includes at least information identifying whether the HNB operates in one of an open mode, a hybrid mode and a closed mode,
   wherein the HNB is configured to receive, from the HNB-GW as part of the HNB registration procedure, a HNB register accept message,
   wherein the HNB is configured to, after receipt of the initial NAS message, transmit, to the HNB-GW as part of a user equipment (UE) registration procedure for the UE, a UE register request message, and
   wherein the HNB is configured to receive, if access control performed at the HNB-GW for the UE is successful, a UE register accept message including a context ID of a UE.

2. The UE according to claim 1, wherein the HNB registration procedure registers the HNB with the HNB-GW and enables the HNB-GW to provide service and core network connectivity for the HNB.

3. A method performed by a user equipment (UE), which communicates with a home base station (HNB), which communicates with a home base station gateway (HNB-GW), the method comprising:
   establishing a Radio Resource Control (RRC) connection with the HNB; and
   transmitting a message carrying an initial non-access stratum (NAS) message to the HNB the message comprising a UE identity, wherein the HNB transmits, to the HNB-GW as part of a HNB registration procedure, a HNB register request message, wherein the HNB register request message includes at least information identifying whether the HNB operates in one of an open mode, a hybrid mode and a closed mode, wherein the HNB receives, from the HNB-GW as part of the HNB registration procedure, a HNB register accept message, wherein after receipt of the initial NAS message, the HNB transmits, to the HNB-GW as part of a user equipment (UE) registration procedure for the UE, a UE register request message, and wherein the HNB receives, if access control performed at the HNB-GW for the UE is successful, a UE register accept message including a context ID of a UE.

4. The method according to claim 3, wherein the HNB registration procedure registers the HNB with the HNB-GW and enables the HNB-GW to provide service and core network connectivity for the HNB.

* * * * *